(12) United States Patent
Blumenfeld

(10) Patent No.: US 12,401,869 B1
(45) Date of Patent: Aug. 26, 2025

(54) SYSTEM AND METHOD FOR IMAGING AN ASTRONOMICAL OBJECT FROM SPACE

(71) Applicant: Erika Blumenfeld, Houston, TX (US)

(72) Inventor: Erika Blumenfeld, Houston, TX (US)

( * ) Notice: Subject to any disclaimer, the term of this patent is extended or adjusted under 35 U.S.C. 154(b) by 0 days.

(21) Appl. No.: 18/770,243

(22) Filed: Jul. 11, 2024

(51) Int. Cl.
| H04N 23/13 | (2023.01) |
| G01N 21/47 | (2006.01) |
| H04N 7/18 | (2006.01) |
| H04N 23/11 | (2023.01) |
| H04N 23/90 | (2023.01) |
| H04N 23/955 | (2023.01) |

(52) U.S. Cl.
CPC ......... H04N 23/13 (2023.01); G01N 21/4738 (2013.01); H04N 7/181 (2013.01); H04N 23/11 (2023.01); H04N 23/90 (2023.01); H04N 23/955 (2023.01); *G01N 2021/4764* (2013.01)

(58) Field of Classification Search
CPC ........ H04N 23/13; H04N 7/181; H04N 23/11; H04N 23/90; H04N 23/955; G01N 21/4738; G01N 2021/4764
See application file for complete search history.

(56) References Cited

U.S. PATENT DOCUMENTS

| 10,753,869 | B2 | 8/2020 | Veeraraghavan et al. |
| 10,970,590 | B2 | 4/2021 | Luharuka et al. |
| 11,178,349 | B2 | 11/2021 | Sankaranarayanan et al. |
| 11,283,993 | B2 * | 3/2022 | Ito .......................... G03B 11/00 |
| 11,471,717 | B1 * | 10/2022 | Novotny .............. G06V 10/143 |
| 11,663,708 | B2 * | 5/2023 | Oyaizu ................... H04N 23/80 |
| | | | 382/254 |
| 11,676,294 | B2 | 6/2023 | Wu et al. |
| 2016/0004810 | A1 * | 1/2016 | Solodovnik ............ G06F 30/17 |
| | | | 318/519 |
| 2016/0189387 | A1 | 6/2016 | Kannan et al. |
| 2019/0178796 | A1 | 6/2019 | Veeraraghavan et al. |
| 2019/0347520 | A1 * | 11/2019 | Sato ....................... G06V 20/10 |
| 2020/0349729 | A1 | 11/2020 | Wu et al. |
| 2023/0415894 | A1 * | 12/2023 | Comin ................... B64D 11/00 |
| 2024/0205552 | A1 * | 6/2024 | Lee ......................... G02B 1/002 |

FOREIGN PATENT DOCUMENTS

EP 3157410 B1 5/2020

* cited by examiner

*Primary Examiner* — Boubacar Abdou Tchoussou
(74) *Attorney, Agent, or Firm* — Perkins Coie LLP

(57) ABSTRACT

Implementations disclosed herein include a method of imaging an albedo of an astronomical object in space. The method includes arranging an imaging system in space with an orientation facing the object. The imaging system includes a lensless image sensor with the orientation that captures images of the object. The method also includes maintaining the imaging system with the orientation facing the object during an imaging data capture session, and it includes capturing near-continuous images with the imaging system during the imaging data capture session. The orientation is maintained for subsequent image data capture sessions. For some implementations, the imaging system includes a lensed image sensor, and capturing the near-continuous images includes simultaneously capturing time-correlated images of the object with the lensed image sensor and the lensless image sensor.

20 Claims, 8 Drawing Sheets

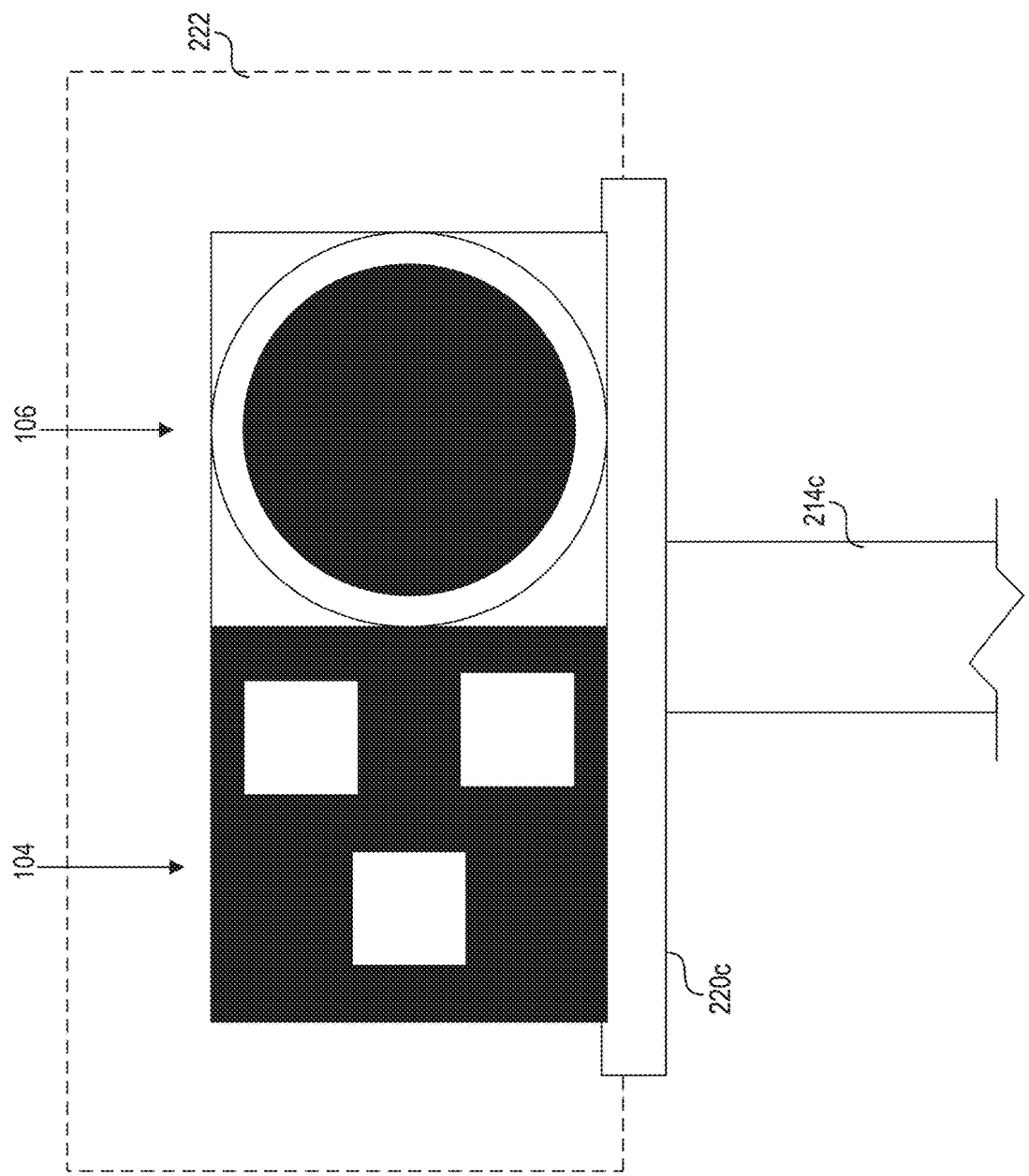

SYSTEM AND METHOD FOR IMAGING AN ASTRONOMICAL OBJECT FROM SPACE

BACKGROUND

Albedo is the fraction of light that is diffusely reflected by a body. It is measured on a scale from 0 (corresponding to fully absorbed radiation) to 1 (corresponding to fully reflected radiation). Albedo often refers to the entire spectrum of solar radiation but can be specified for a given wavelength (spectral albedo). Most solar energy reaches the surface of earth between 0.3 µm and 3 µm. This spectrum includes visible light between 0.4 µm and 0.7 µm. Generally, surfaces with a low albedo appear dark and surfaces with a high albedo appear bright. Thus, tree cover and open ocean have lower albedo and absorb more solar energy while glacier and snow have higher albedo and reflect much more solar energy.

Albedo is often considered an important concept in climatology, astronomy, and environmental management. The average albedo of the Earth from space, its planetary albedo, is currently thought to be between 29% and 31% (0.29-0.31), but cloud albedo or local surface albedo varies widely across the Earth because of different geological and environmental features, and climatological feedbacks caused by climate change. Albedo in the visible light spectrum falls within a range of about 90% (0.9) for fresh snow to about 0.04 for charcoal. Earth's surface albedo has been estimated via Earth observation satellite sensors such as NASA's MODIS instruments on the Terra and Aqua satellites, and the VIIRS instruments on the Suomi NPP and JPSS satellites. Albedo is calculated using mathematical models that combine multiple reflectance measurements in different directions collected from satellites. The MODIS and VIIRS instruments weigh more than 225 kilograms (more than roughly 500 pounds).

Traditional cameras use a lens or lenses to image a scene. The lens directs light from each point in the scene to a single point onto a light-sensitive medium, such as film or image sensors. In digital cameras, the image sensor is a two-dimensional array of pixels that converts the light captured by the lens into electrical signals that encode the imaged scene pixel by pixel into digital image data. Using the digital image data, the scene can be reconstructed and displayed as a digital image or printed on a physical medium.

BRIEF DESCRIPTION OF THE DRAWINGS

Detailed descriptions of implementations of the present invention will be described and explained through the use of the accompanying drawings.

FIG. 2b illustrates a front view of an embodiment of the system.

Figure 1:
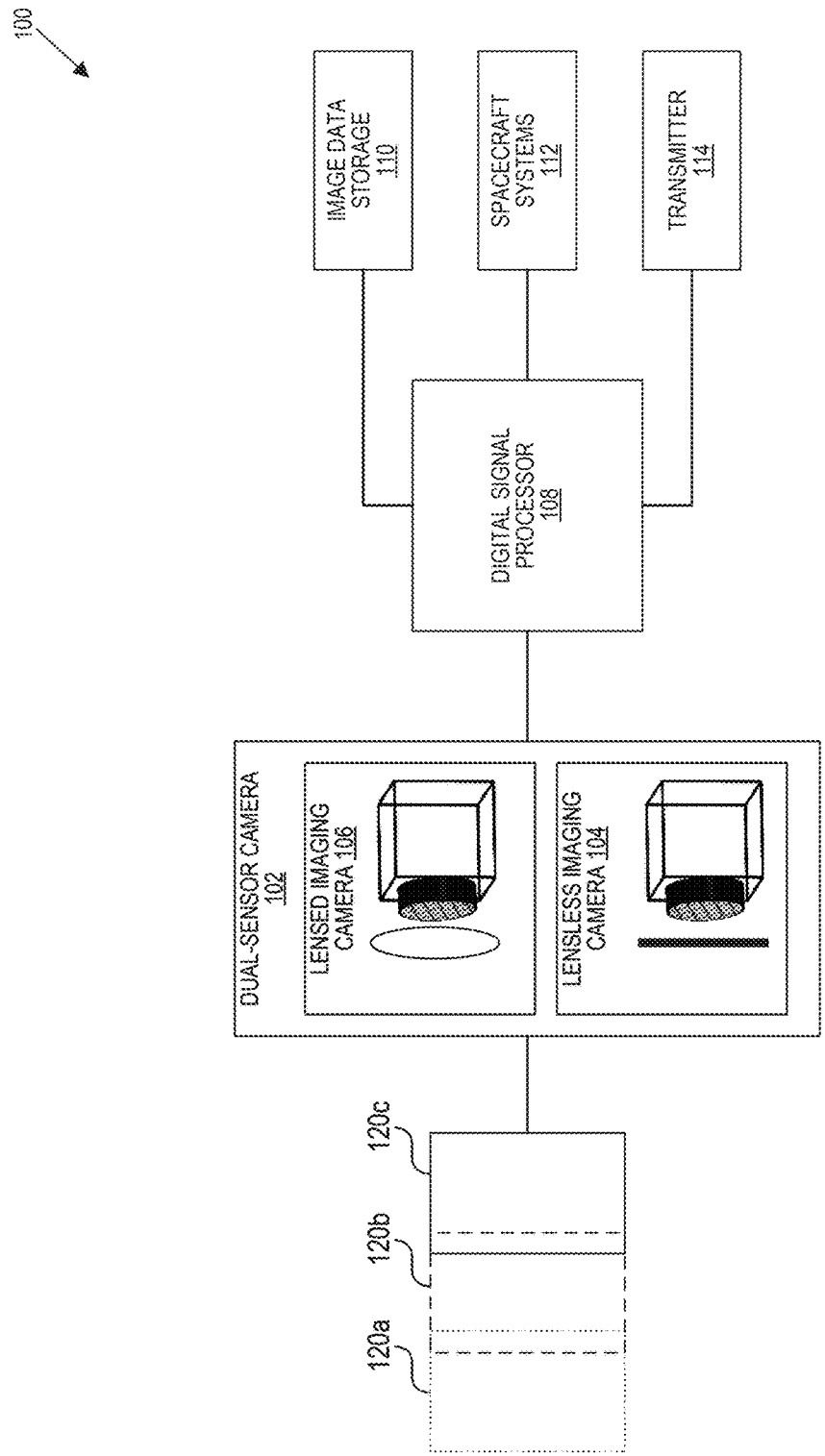
FIG. 1 illustrates a block diagram of an embodiment of the system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system for imaging an astronomical object from space using a lensless imager and a lensed imager. An imager is an instrument, electronic device, or other device that can record an image, such as a camera. The system performs a variety of Earth sensing, astronomical object sensing, or object sensing data such as high-resolution images, local albedo, and/or broadband albedo. High-resolution images can be captured using the lensless imager and the lensed imager and can capture image data related to the whole planetary environment, such as Earth's physical characteristics, surface features, cloud cover, and biosphere activity. The system uses the lensless imager to capture the albedo of the astronomical object. In some embodiments, the system can use the lensed system to capture the albedo of the astronomical object. The system captures an aggregate albedo dataset and, in one orbital implementation, can measure approximately 90% of Earth's inhabited surface while also simulating the variability of Earth's seasonal lighting conditions and/or the amount of reflected solar radiation, i.e., the amount of albedo. Earth's surface albedo is listed as one of the five contributors to aggregate Climate Sensitivity, indicating that data collected within the system's spectral parameters are viable and relevant to climate science. A decrease in Earth's albedo indicates that the Earth is absorbing an increased quantity of solar energy, corresponding to an increase in climate change, which could be caused by multiple anthropogenic actions and climate feedbacks. The system allows the measurement of the Earth's albedo to track changes in climate change. For example, the system can record reflected shortwave radiation (or planetary albedo), which can be used to calculate both top of atmosphere (TOA) and surface albedo. These calculations can contribute to radiative forcing estimations that study how TOA and surface changes (e.g., land cover, land use, seasonal wildfires, mountaintop snow decline, flooding, desertification, deforestation, agriculture, etc.) affect aggregate Climate Sensitivity and Earth's energy balance. The system can also be implemented to assist in disaster response and environmental risk tracking, such as hurricane and wildfire imaging and imaging of artificial illumination of cities at night.

Imaging albedo from space has been done, but historically only in limited circumstances with expensive, specialized imaging systems, including immense satellite systems with large optics and imagers that have considerable weight and exorbitant associated system costs. Digital imaging and improvements in computational science have enabled new imaging architectures that have used lensless optical technology such as a phase mask instead of an optical lens inserted into the optical path of a traditional camera. The resulting image data encodes the scene differently than traditional lensed cameras, like those used in traditional earth-sensing imaging systems, and generally results in blurred or unrecognizable images. Some computational imaging applications use optical plates or masks instead of lenses, where the raw signals do not superficially resemble a traditional image but where computational methods extract the final image from the encoded image data captured without a traditional lens. Image sensors with optical plates or masks, instead of lenses, have been used in microscopy applications with computational image processing to encode and image microscopic scenes but have not been used to capture large macroscopic scenes, such as the surface of the Earth from space.

In some embodiments, the disclosed technology incorporates a dual-imager imaging system that provides high-quality imaging with reduced weight, size, and cost compared to traditional albedo imaging systems. The dual-imager imaging system includes professional-grade image sensors in a lensed and lensless setup configured to detect light radiation. The lensless imager uses a professional-grade image sensor without a conventional optical lens. The system may have an optical mask or plate, but no optical lens. The lensed imager includes an optical lens. The lensed imager is used to calibrate the images captured with the lensless imaging system.

The lensed imager and the lensless imager capture time-correlated images of the same scene and create a time-correlated dataset. The albedo measurements are captured using the lensed and lensless imagers and then derived computationally from the resulting image data. Time-correlating the datasets allows the lensed image data to act as a baseline standard that the lensless image data is compared against to assist in accurate computational reconstruction of the lensless images and for comparing derived albedo measurements from the lensless image data. The time-correlated dataset is processed so that the lensed image data and lensless image data are co-evaluated to generate correlated high-resolution image datasets of the scene, including the albedo. With this implementation, the optical lens on the lensed image sensor is generally a field of view (FOV)-targeted professional-grade lens. Existing imaging systems for capturing albedo deployed in space can weigh more than 225 kilograms and have dimensions exceeding one cubic meter (1 m$^3$). In contrast, the dual-imager imaging system described herein can weigh less than 20 kilograms and, in other implementations, less than 10 kilograms. Similarly, the dimensions of the dual-imager imaging system can be less than one-tenth of a cubic meter (0.1 m$^3$). Furthermore, once the dual-imager system has provided sufficient data to train the lensless system's image computation, the lensed system can be retired or removed entirely so that subsequent versions of the system need only be the lensless imaging system by itself, reducing the size and weight of the system by approximately half.

To capture or image the albedo of an object, such as the Earth, a planetary body, or another astronomical object, from space, the dual-imager imaging system is arranged in a satellite or spacecraft in orbit facing the object, e.g., the Earth, and records light radiation or changes in radiative forcing using the dual-sensors. As the dual-imager imaging system orbits the object, the lensed and lensless imager simultaneously capture time-correlated images over a predetermined time period, such as the 189-day cycle of the entire lighting procession of the Earth from a satellite with an inclined, sun-asynchronous orbit such as the International Space Station. The period between image captures is selected such that the time-correlated images captured at one instant capture a portion of the object's surface that overlaps with the portion of the object's surface captured in the immediately preceding time-correlated image. The resulting dataset includes images—with time-correlated lensed and lensless captures—covering overlapping portions of the object's surface that can be joined together to produce a seamless image dataset of the object's surface. When the period for each image capture is small enough to create overlapping images of the surface of the object, the image capture is considered near-continuous imaging.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Albedo Imaging System

FIG. 1 illustrates a block diagram of an embodiment 100 of the system. The embodiment 100 includes a dual-sensor imaging system 102. The dual-sensor imaging system 102 includes a lensed imager 106 and a lensless imager 104 and can include a housing configured to be fixed to a spacecraft. The hybrid system using the dual-sensor imaging system 102 creates data redundancy and built-in data verification. The system uses the dual-sensor imaging system 102 to generate multiple time-correlated images of a location on an object, such as an astronomical object located in space. The lensless imager 104 and the lensed imager 106 simultaneously capture images to create a dataset that can be used to reconstruct, verify, and calibrate the images captured with the lensless imager 104. In some embodiments, a machine-learning model is used to calibrate the lensless imager 104 by training the machine-learning model with the dataset created by the simultaneously captured images. For example, to calibrate the dataset, the images captured using the lensless imager 104 are evaluated against those captured using the lensed imager 106. Therefore, the dataset of images captured with the lensed imager 106 can act as the standard, which can be evaluated against satellite image data to analyze the dataset against current industry standards. The calibration, evaluation, and/or the derivation of the albedo from the datasets could occur locally on the system while in orbit around an object or be performed by a remotely located computer system. When the evaluation and calibration occur remotely, the datasets from the lensless imager 104 and the lensed imager 106 are transmitted to the remotely located computer system through intermittent downlinks (e.g. daily, weekly, or monthly). By performing intermittent downlinks consistent assessment and verification of the system can occur by a user. This allows a user to adjust the system and/or computations used to derive the broadband albedo when needed to generate a more accurate and complete dataset. During the downlinks, the system can also transmit only a subset of the captured images to reduce the amount of data transmitted. Additionally, performing these processes through downlinks reduces the computational load of the system, allowing the system to need less processing power and thus have a smaller size.

For example, the lensed imager 106 and the lensless imager 104 can use a high-resolution visible near-infrared (VNIR) complementary metal oxide semiconductor (CMOS) imaging sensor with a wavelength range of approximately 0.4 to 1.2 µm. High-resolution VNIR CMOS imaging sensors capture RAW image files that can be, for example, 13,272×9,176 pixels, where the pixels are 2.2 µm and have a 10-bit depth. In some embodiments, the lensed imager 106 and the lensless imager 104 can use a four-channel Bayer RGB color plus infrared broadband sensor with an approximate 0.4-1.2 µm wavelength range. Different sensors and sensor types can be used to adjust spectral ranges to meet specific imaging application goals. High-resolution sensors in the VNIR spectral range allow the system to image reflected shortwave radiation (or planetary broadband albedo), which is one of the four primary top-of-atmosphere (TOA) components used to calculate Earth's energy budget. While TOA cloud reflectance is the dominant mechanism for outgoing radiation, surface albedo is a significant factor in albedo variation, especially considering feedback and surface changes due to climate change across short and long timescales (e.g., seasonal wildfires, mountaintop snow decline, flooding, desertification, etc.) as well as anthropogenic land use (e.g., deforestation, agriculture, etc.).

The lensed imager 106 can accommodate different lenses with varying focal lengths to achieve a different ground instantaneous field of view (GIFOV). For example, when the dual-sensor imaging system 102 is installed at the orbital distance of the International Space Station, equipping the lensed imager 106 with a 50 mm lens yields a resolution of approximately 20 meters per pixel and a GIFOV of approximately 169×245 kilometers$^2$ per image. The lensless imager 104 can include a phase mask to modify the phase of the light waves passing through it. For example, the phase mask can include opaque regions to block the transmission of light and open regions to transmit light radiation to the lensless imager's 104 sensor. The phase mask can be fabricated as a static transmissive mask or as a phase spatial light modulator (SLM). The phase SLM can be programmatically changed to realize various phase mask versions to provide better flexibility in determining the optimal phase mask that best fits the targeted application or sensor type. The phase mask ensures that all incoming light onto the sensor interacts adequately with the SLM and is fully captured on the image sensor. The phase mask can have tolerances at a micron scale to reduce variations from the expected measurements in the dataset. The measurements captured onto the sensor by the lensless system can be used to computationally reconstruct the imaged scene and computationally derive albedo of the imaged scene.

The dual-sensor imaging system 102 captures RAW image data of the same location simultaneously using both the lensed imager 106 and the lensless imager 104. To capture RAW image data of the entire orbited object, such as the Earth, multiple images need to be captured to amass a data set that can be used to computationally derive the complete broadband albedo of the object. In some embodiments, the sequential data of the object can be stitched or composited together to create a more localized surface albedo map, including a full luminance map of the object. To accomplish this, the system captures multiple images that correspond to overlapping locations of the object. For example, the system can capture a first image 120*a* and then a second image 120*b*. The second image 120*b* is captured by the system at a predetermined time period after the first image 120*a*, such as 30 to 60 seconds or 1 to 100 seconds. The time period is based on factors, such as orbital speed of the object and the distance the system is located from the object. This time period causes the second image 120*b* to capture an image of a location that overlaps with the location captured in the first image 120*a*. The system then captures a third image 120*c* at the next predetermined time interval to overlap with the location captured by image 120*b*. The system continues to capture images this way until every location visible along the orbital pathway on the object is imaged.

The system includes a digital signal processor 108. The RAW image data captured by the dual-sensor imaging system 102 corresponds to the first image 120*a*, the second image 120*b*, the third image 120*c*, (images 120), and so forth and is processed by the digital signal processor 108. The digital signal processor 108 can convert the RAW image data captured by the sensors into a visual representation or images 120 while still retaining the RAW image data. The system can include a data interconnected board coupled to the processor, the lensless imager 104, and the lensed imager 106. The images 120 are stored in the image data storage 110. The image data storage 110 can be one or more data storage hard drives, where the total amount of hard drives and storage capacity is determined based on the total number of image frames and the number and type of imager used. The total number of image frames and the number and type of imagers used is dependent on the size of the object being measured, the spacecraft's orbital speed and altitude, and any other specific objectives determined for image acquisition goals. For example, a total storage capacity of approximately 90 Terabytes or less can be used to record the complete albedo of an object, such as the Earth, during a 378-day cycle when the system is located in the ISS and using a 50 mm lensed imager system and inferred 50 mm lensless imager system.

In some embodiments, the system can computationally derive, using a predetermined algorithm, the broadband albedo from the image data locally while orbiting the object in real time or after the entire object has been captured. In some embodiments, the system can computationally derive the broadband albedo remotely, for example, on Earth. When the system remotely derives the broadband albedo, the image data can either be transferred wirelessly to the remotely located location, such as a location on Earth, or the image data can be transferred to a storage device that is sent from orbit to the remotely located location. After the object's albedo has been computationally derived, the system can stitch the images of the albedo derived from each location on the object to generate a high-resolution, continuous, seamless image of the object's albedo. This process can be done locally or remotely and in real-time or after a certain amount of the dataset has been recorded. The system itself can perform the processing, or a user can assist in the process.

The system includes a transmitter 114. The transmitter 114 is configured to transmit the images 120 captured by the system from space to a location on Earth where the images 120 can be analyzed. The system is connected to a series of spacecraft systems 112. The spacecraft systems 112 includes power supplied by the spacecraft, such as 28V DC power that is supplied by the window observational research facility (WORF) of the International Space Station (ISS) and a power converter to convert the power to 12V DC power, which is used by the system. The space craft systems can also include an electromagnetic power filter configured to couple to the power supply. The spacecraft system 112 can also include ethernet capabilities to send captured images to Earth using the ISS to the local area network (LAN) so that periodic data integrity checks can be performed.

Figure 2A:
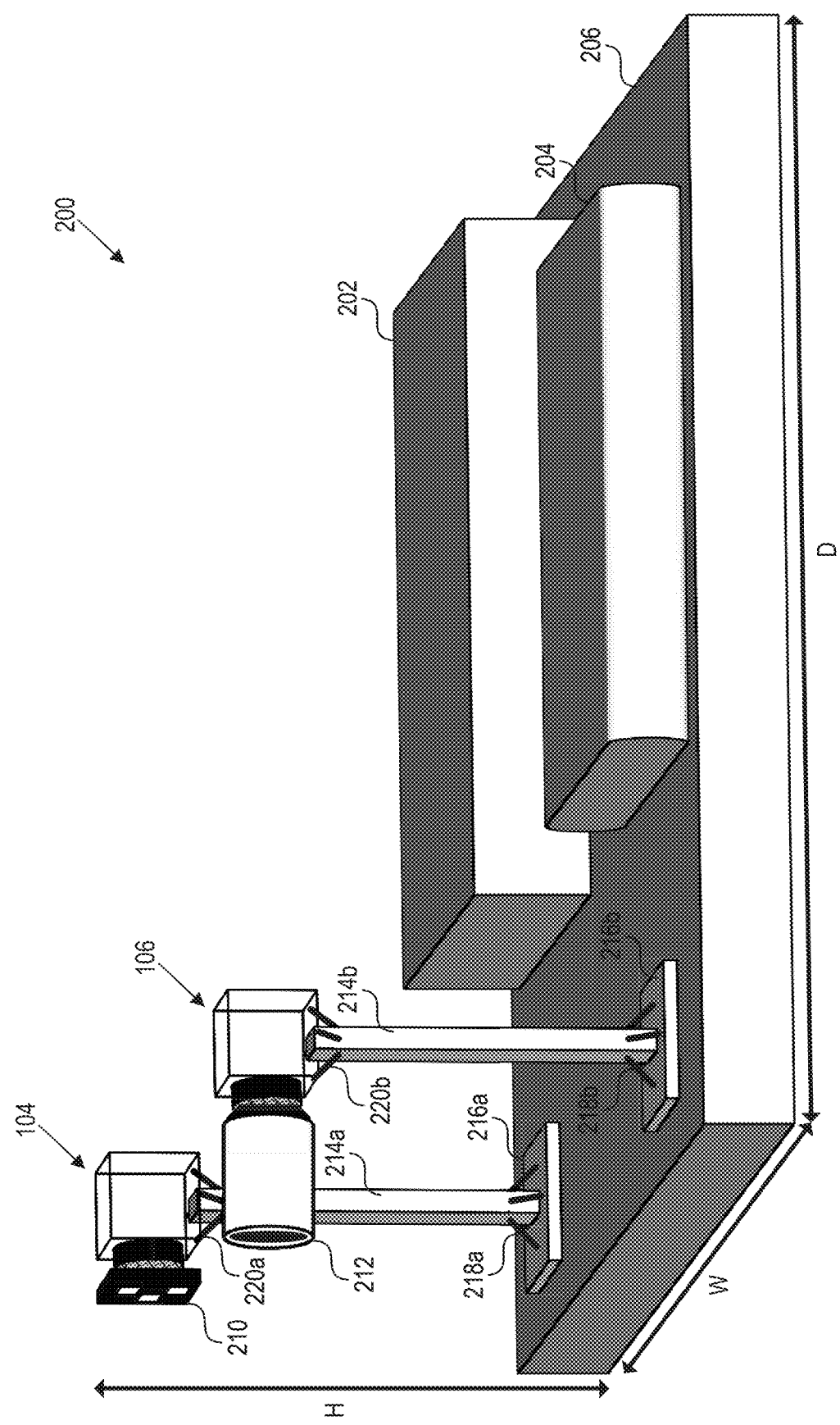
FIG. 2a illustrates an isometric view of an embodiment of the system.

FIG. 2a illustrates an isometric view of an embodiment 200 of the system where the lensless imager is a lensless camera and the lensed imager is a lensed camera. The system includes a baseplate 206 configured to act as a mounting base for which the other components of the system are mounted, such as the lensless camera 104 and the lensed camera 106. In one embodiment, the baseplate 206 defines the footprint of the system and has a width of 11 inches and a depth of 15 inches. The system has a total height of 20 inches giving a total volume of less than 0.1 m$^3$. Lensless camera mount 214a is configured to receive the lensless camera 104 so that the lensless camera 104 can be mounted in a consistent and repeatable orientation and position. Lensless camera mount 214a includes camera support 220a, which stabilizes the lensless camera 104 so that it does not change position due to the microgravity, orbital, and spacecraft environment (e.g., vibrations from truss flexure, motion drag, maneuvers of the spacecraft, and crew activity). Lensless camera mount 214a also includes a lensless camera mount base 216a and lensless camera mount base supports 218a. The lensless camera mount base 216a secures the lensless camera mount 214a to the baseplate 206. The lensless camera mount base 216a can be an isolation mount. The lensless camera mount base supports 218a prevent the lensless camera 104 from moving and changing position due to the microgravity, orbital, and spacecraft environment.

Lensed camera mount 214b is configured to receive the lensed camera 106 so that the lensed camera 106 can be mounted in a consistent and repeatable orientation and position. Lensed camera mount 214b includes a camera support 220b, which stabilizes the lensed camera 106 so that it does not change position due to the microgravity, orbital, and spacecraft environment. Lensed camera mount 214b also includes a lensed camera mount base 216b and lensed camera mount base supports 218b. The lensed camera mount base 216b secures the lensed camera mount 214b to the baseplate 206. The lensed camera mount base 216b can be an isolation mount. The lensed camera mount base supports 218b prevent the lensed camera 106 from moving and changing position due to the microgravity, orbital, and spacecraft environment. The lensless camera mount 214a and the lensed camera mount 214b allow the lensless camera 104 and the lensed camera 106 to be positioned in a way where the lensless camera 104 and the lensed camera 106 are adjacent and capture images at the same time and the same location on the object.

In some embodiments, lensless camera 104 and lensed camera 106 are co-mounted, shown in FIG. 2b, so as to reduce the distance between two cameras. Co-mounting lensless camera 104 and lensed camera 106 causes the two camera bodies to be contiguous to or touching each other to increase the overlap between the image data captured during the time-correlated image capture. Mounting lensless camera 104 and lensed camera 106 in this manner reduces the computing resources needed to correlate the image data. Co-orienting the cameras in this way can additionally allow the image data to be processed for 3D or stereoscopic image products for 3D analysis of the object, providing further details about local surface characteristics and albedo mechanisms.

The lensless camera 104 includes a phase mask 210. The phase mask 210 is mounted in front of the image sensor of the lensless camera 104. The phase mask 210 is positioned between the object being imaged and the image sensor of the lensless camera 104. The phase mask 210 can be configured and modified based on the lighting conditions or the type of lensless sensor used in the lensless camera 104. The lensed camera 106 includes a camera lens 212. The camera lens 212 is mounted in front of the image sensor of the lensed camera 106. The camera lens 212 is positioned between the object being imaged and the image sensor of the lensed camera 106. The camera lens 212 focuses light onto the image sensor of the lensed camera 106 to allow the image sensor to generate an image. The focal length chosen for the camera lens 212 can affect how much of the object is captured in a single image or the perspective of the image. For example, a 50 mm focal length captures an image that is similar to what is experienced by the human eye. A shorter focal length, such as 35 mm or 18 mm, captures a wider field of view and can change the perspective of the image to cause the object to appear further away. A longer focal length, such as 100 mm or 200 mm, captures a smaller field of view and can change the perspective of the image to cause the object to appear closer.

The system includes a data storage device 204. The data storage device 204 is mounted to the baseplate 206 and communicatively coupled to the intelligence system 202. The data storage device 204 can be mounted behind the lensless camera 104 and the lensed camera 106 to prevent the data storage device 204 from blocking or interfering with the image capture performed by the dual camera system. The intelligence system 202 is mounted to the baseplate 206. In some embodiments, the intelligence system 202 is mounted to the data storage device 204. The intelligence system 202 contains a processor to process the image data captured by the lensless camera 104 and the lensed camera 106 and a transmitter to transmit the image data and/or processed images from the spacecraft to another location.

FIG. 2b illustrates a front view of an embodiment of the system where the lensless imager is a lensless camera and the lensed imager is a lensed camera. The embodiment includes dual camera support 220c. Dual camera support 220c is configured to support both lensless camera 104 and lensed camera 106. Dual camera support 220c allows lensless camera 104 and lensed camera 106 to be mounted contiguous to each other. Mounting lensless camera 104 and lensed camera 106 contiguous to each other increases the overlap between the image data captured with each camera, reducing the amount of computation needed to correlate the different sets of image data. The dual camera support is coupled to camera mount 214c. Camera mount 214c is rigidly mounted in place to maintain the desired orientation of lensless camera 104 and lensed camera 106. The dual camera support 220c allows lensless camera 104 and lensed camera 106 to be supported with a single camera mount. Lensless camera 104 and lensed camera 106 are encompassed in housing 222. Housing 222 is configured to protect the lensless sensor of lensless camera 104 and the lensed sensor of lensed camera 106 from cosmic rays. Cosmic rays can damage sensors by causing inclusions or artifacts, dead pixels, and hot spots in the image data that correspond to a strong increase in dark current or in a decrease in transfer efficiency in the sensor.

Figure 3:
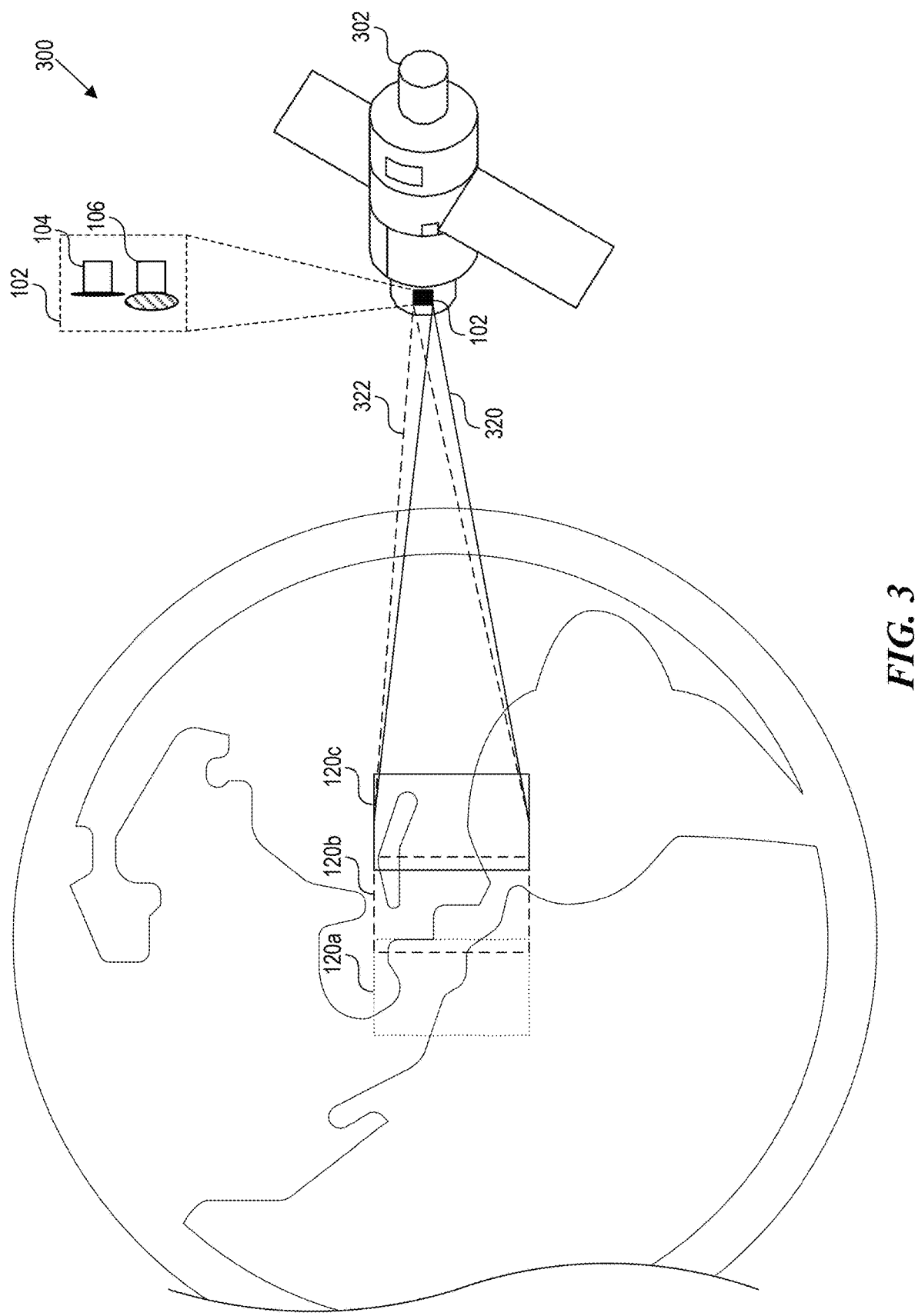
FIG. 3 illustrates an embodiment of the system mounted in a spacecraft orbiting the Earth.

FIG. 3 illustrates an embodiment 300 of the system mounted in a spacecraft 302 orbiting the Earth. The spacecraft 302 can be a satellite, as illustrated in FIG. 3, or a space station such as the ISS. The spacecraft 302 orbits around the Earth. The orbit of the spacecraft determines the imaging sequence, duration, and relative position above Earth's surface, which dictates the orientation and direction of the ground coverage depicted in the imaging sequence. The spacecraft 302 can have an orbit around the Earth that covers the entire 189-day seasonal lighting procession. The dual-sensor imaging system 102, including the lensless imager 104 and the lensed imager 106, is mounted inside the spacecraft 302 to protect the system from damage. In some embodiments, the dual-sensor imaging system 102 can be mounted exterior to the spacecraft. The spacecraft 302 positions the dual-sensor imaging system 102 to constantly face the Earth during the spacecraft's 302 orbit. The dual-sensor imaging system 102 causes the lensless imager field of view 320 and the lensed imager field of view 322 to cover an identical geographic area of the Earth. As the spacecraft 302 moves in its orbit, the geographic region of the Earth that the dual-sensor imaging system 102 images changes. For example, using the dual-sensor imaging system 102, the system records image data of a first geographic location to generate the first image data 120a. The system then records image data of a second geographic location that overlaps with the first geographic location to generate the second image data 120b. The system then records image data of a third geographic location that overlaps with the second geographic location to generate the third image data 120c. The time interval between when a subsequent image is captured can be approximately 30 to 60 seconds and is based on the speed of the spacecraft 302 and the orbit of the spacecraft 302.

FIG. 4 illustrates multiple embodiments of a single day of orbits of the ISS during daylight hours as provided by the NASA Space Station Orbital Tutorial. When imaging the Earth or recording image data of the Earth, the orbit of the ISS determines when and where different geographic locations can be imaged. Additionally, due to the orbit of the ISS, three 63-day light cycles are needed to image the entire Earth during daylight hours. The system also captures image data during nighttime hours to compile other imagery data, such as that related to anthropogenic illumination intensity in urban areas or wildfires.

The ISS travels from west to east on an orbital inclination of 51.6 degrees. Each orbit takes 90-93 minutes, depending on the exact altitude of the ISS. During that time, part of the Earth is viewed under darkness and part under daylight. The ISS orbital altitude drops gradually over time due to the Earth's gravitational pull and atmospheric drag. Periodic reboots adjust the ISS orbit. As the ISS orbital altitude decays, the orbit tracks on Earth change slightly. With each orbit taking 90-93 minutes, there are approximately 16 orbits per day (24 hours). The exact number of orbits per day is usually less than 16 (generally 15.5 to 15.9 orbits/day), depending on the altitude of the ISS. Each orbit shifts to the west by approximately 22.9° of longitude (measured as the position where the orbit crosses the equator).

The part of the Earth visible to the ISS in daylight changes due to the interaction between the station's orbit patterns and the Earth's rotation. The daylight portion of the orbits shifts slightly eastward along the track each day. This lighting procession follows an approximately 63-day cycle from a descending track covering the mid-latitudes, to southern hemisphere lighting, to ascending tracks, and to northern hemisphere lighting. This cycle, plus seasonal changes in solar incidence, causes the sun illumination angles to vary every time the station passes over a given region.

Figure 4A:
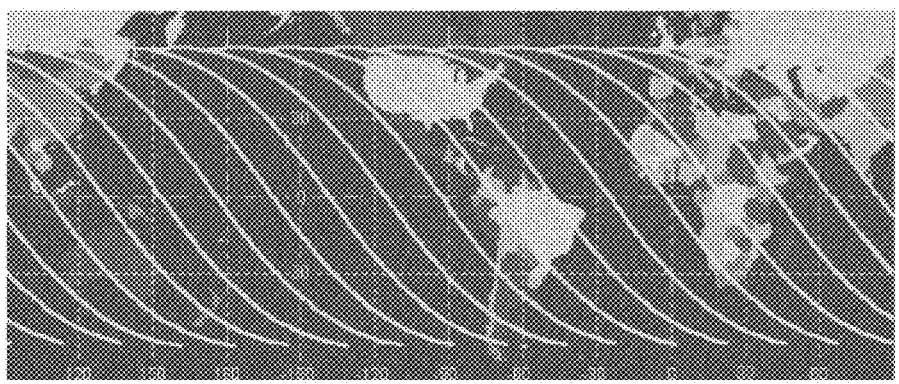
FIG. 4a illustrates the cycle of daylight procession of one day of orbits with daylight on a descending pass.
Figure 4B:
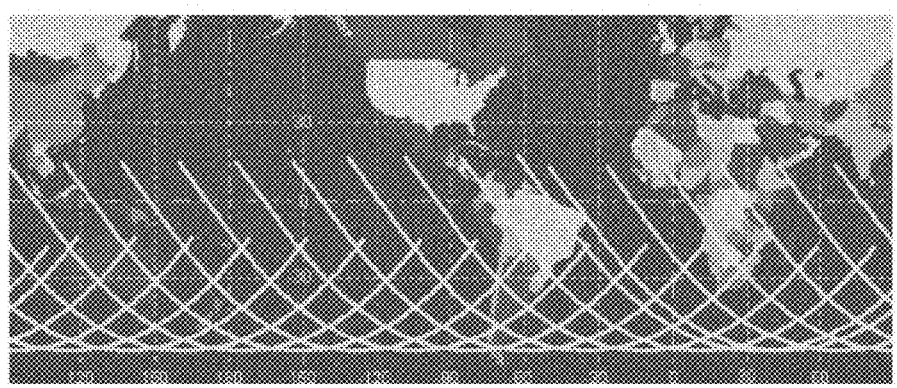
FIG. 4b illustrates the cycle of daylight procession of one day of orbits with daylight in the Southern Hemisphere.
Figure 4C:
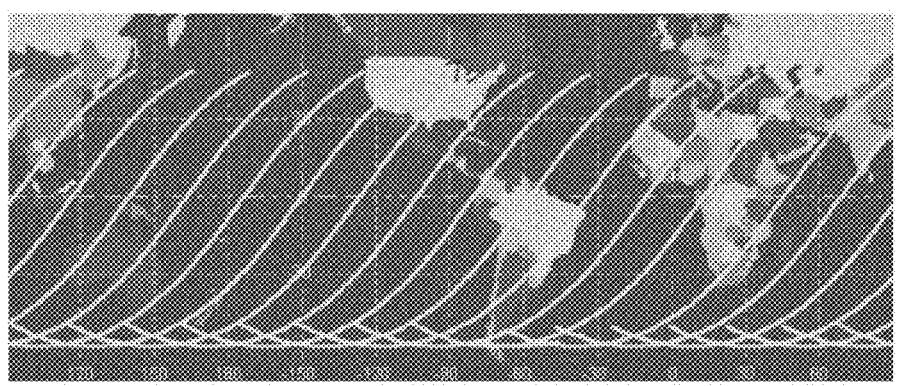
FIG. 4c illustrates the cycle of daylight procession of one day of orbits with daylight on an ascending pass.
Figure 4D:
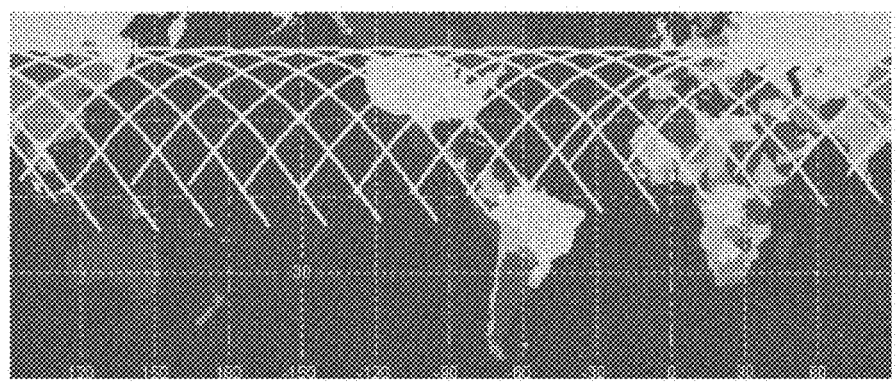
FIG. 4d illustrates the cycle of daylight procession of one day of orbits with daylight in the Northern Hemisphere.

FIG. 4a illustrates the cycle of daylight procession of one day of orbits with daylight on a descending pass. FIG. 4b illustrates the cycle of daylight procession of one day of orbits with daylight in the Southern Hemisphere. FIG. 4c illustrates the cycle of daylight procession of one day of orbits with daylight on an ascending pass. FIG. 4d illustrates the cycle of daylight procession of one day of orbits with daylight in the Northern Hemisphere.

Figure 5:
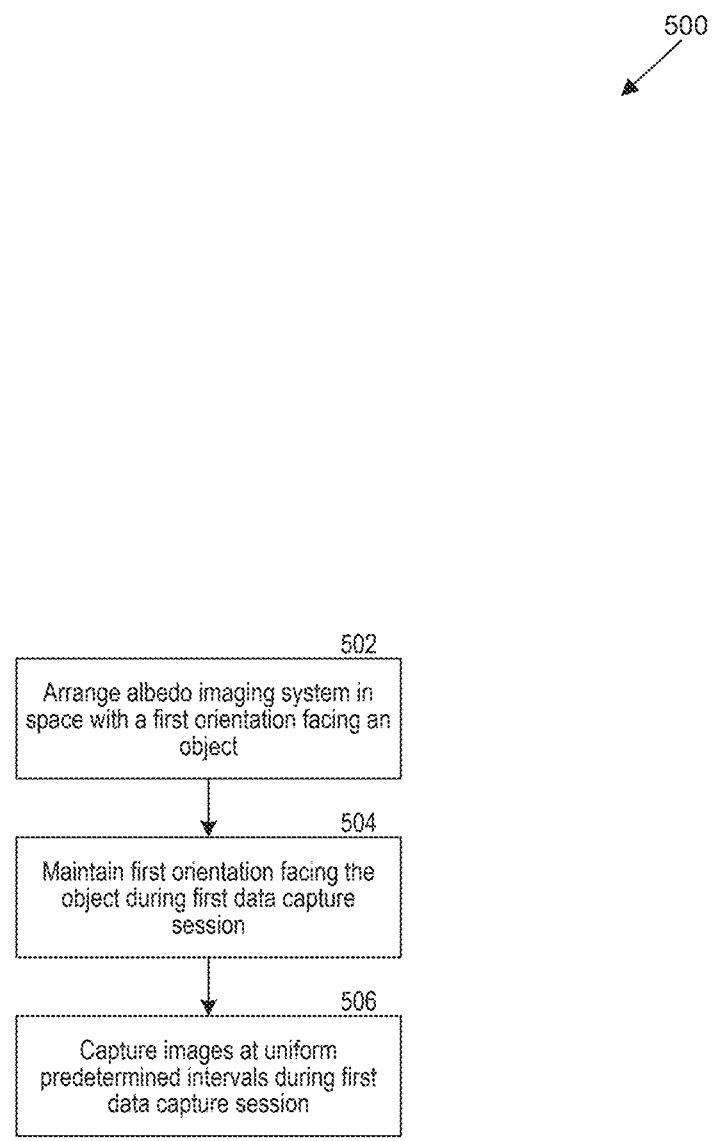
FIG. 5 is a flowchart that illustrates an embodiment of the system.

FIG. 5 is a flowchart that illustrates an embodiment of the system. In one example, the system can be embodied in a computer system, the system including at least one hardware processor and at least one non-transitory memory storing instructions, which, when executed by at least one processor, cause the system to perform the process 500.

The system can image an albedo of an object in space. At step 502, the system arranges an imaging system in space with a first orientation facing the object. The imaging system comprises a lensless image sensor configured with the first orientation to capture images of the object. In one example, the system captures a second set of images using a lensed image sensor. The system time-correlates the images captured with the lensless sensor with the second set of images.

At step 504, the system maintains the imaging system in the first orientation during a first imaging data capture session. In one example, the system maintains the imaging system with the first orientation facing the object during a second imaging data capture session. The system captures images at the uniform predetermined interval with the imaging system during the second imaging data capture session for the predetermined duration. In another example, the system maintains the imaging system with the first orientation facing the object during a third imaging data capture session. The system captures images at the uniform predetermined interval with the imaging system during the third imaging data capture session for the predetermined duration.

At step 506, the system captures images at a uniform predetermined interval with the imaging system during the first imaging data capture session of a predetermined duration. In one example, the uniform predetermined interval is between 1 second and 100 seconds. In another example, the uniform predetermined interval is proportional to the duration of an orbit around the object. In another example, the uniform predetermined interval is less than one one-thousandth the duration of the orbit. In another example, the uniform predetermined interval is of a length to allow for the capture of overlapping images. The system generates seamless composite image data set of the object. The image data set can then be transformed into a single composite image of the object either by the system or a user. In another example, the system records albedo variations of Earth, allowing for determinations in a change in radiative forcing, which is a contributing factor to measured variations in climate change.

Phase Mask

Figure 6:
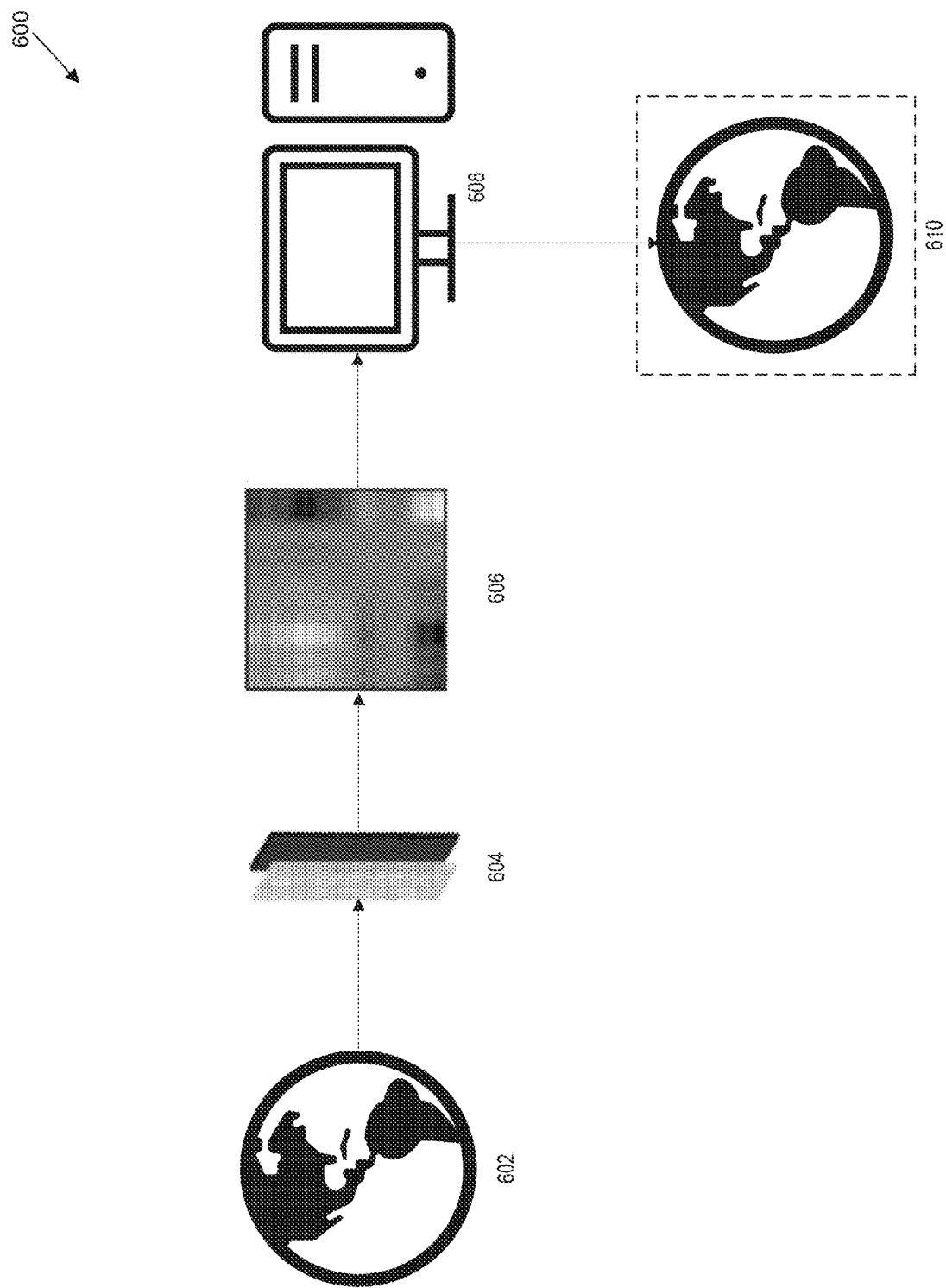
FIG. 6 illustrates a block diagram of a process of capturing an image with a phase mask.

FIG. 6 illustrates a block diagram of an embodiment 600 for capturing an image with a phase mask. Object 602 is an object that has an albedo signature that can be measured by orbiting the object. The albedo is measured using a lensless imager system and phase mask 604. The simplest lensless imaging system is the pinhole camera. It is inefficient, however, since the small pinhole restricts the amount of light reaching the sensor. Coded aperture cameras improve the light efficiency using a phase mask 604 with an array of pinholes. The sensor measurements become a superposition of the images formed by each aperture, and a computational recovery algorithm reorganizes the measurements to recover the image 610.

Phase mask 604 is an optical modulator (e.g., a coded amplitude mask, a diffuser) placed between the object 602 and the image sensor. The phase mask 604 is typically placed very close to the image sensor. The working distance from the lensless imager that the object 602 is, is often not a design degree of freedom but rather an application-dependent constraint, which has significant implications for the design in the following two ways. First, the object distance imposes physical limits on what illumination strategies can be incorporated. As the object 602 distance becomes larger, there are fewer physical constraints on illumination devices, and the smaller numerical aperture gives more flexibility for achieving near-uniform illumination of the target. In photography, for example, ambient illumination is usually sufficient, whereas, in fluorescence microscopy, one must design for both the illumination and detection devices. Second, the absence of a focusing lens means there is no magnification in lensless imaging devices; the system is non-telecentric, and resolution varies with depth. Both the sensor and the mask 604 are assumed to be planar and parallel to each other. The mask 604 is placed a distance (typically measured in microns) in front of the sensor; hence, we can assume the sensor is placed on the plane z=0 and the mask 604 on the plane z=d. The mask 604 is binary-valued and consists of opaque and transparent elements that either block or transmit light. An important variable is the smallest feature size on the mask.

A measurement 606, which looks nothing like the final image, is captured on the image sensor, and a computational inverse algorithm 608 is solved typically using a computing device to reconstruct the image 610 of the object 602. The relationship between the object 602 and the measurement 606 can often be written as linear matrix multiplication, so the captured image is interpreted as a weighted sum of system response functions, one from each point in the scene. Solving the inverse problem to reconstruct the image 610 then involves inverting the system matrix, which must be known or calibrated. Based on different optical modulations, lensless systems can be broadly classified into illumination-modulated, mask-modulated, and programmable-modulator systems.

To reconstruct the image 610, lensless imagers need to optically encode the scene information, e.g., by having a different system response for each pixel of the scene. The system response could be a holo-graphic response when the scene interferes with coherent light or could be a pattern produced by an optical element in the system. Prior systems in the field have attempted to reconstruct images from a lensless system consisting of solely a sensor, without any diffusion or phase mask, placed some distance from object 602, the result is an extremely ill-posed inverse problem since there is very little difference between measurements taken from different positions in the scene. Hence, a modulating optic or phase mask is generally required for practical lensless imaging, such that the measurement is significantly different for each pixel in the scene.

Computer System

Figure 7:
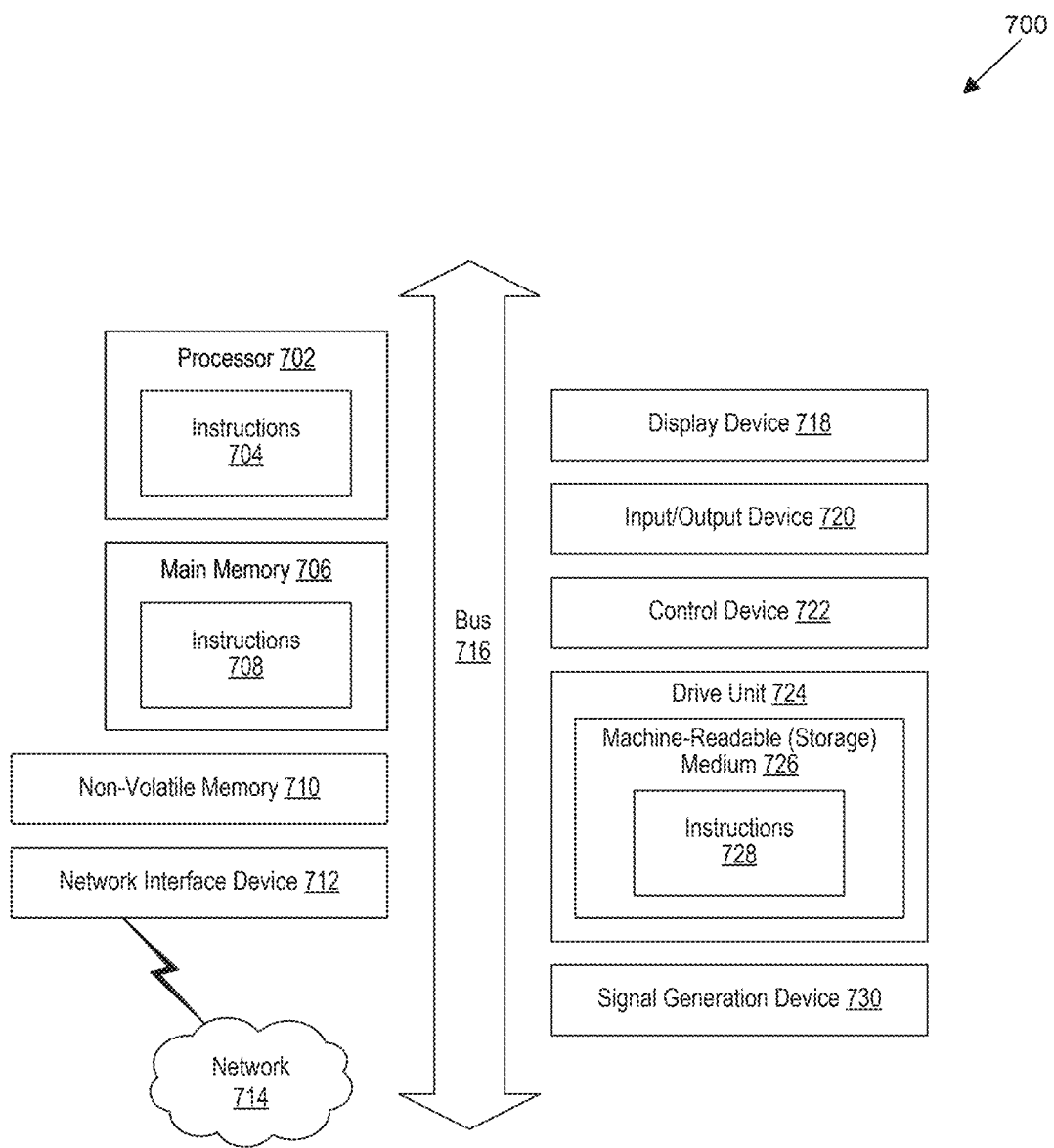
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 6 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A space-based imaging system configured to image an object in space, the space-based imaging system comprising:
   a system housing configured to be fixed within a spacecraft;
   a lensed camera fixed within the system housing and facing a first direction, the lensed camera comprising a first image sensor and an optical lens coupled to the first image sensor,
      wherein the first image sensor is configured to detect light radiation in a visible near-infrared light spectrum, and
      wherein the lensed camera is configured to capture images in the first direction;
   a lensless camera fixed within the system housing adjacent the lensed camera and facing the first direction, the lensless camera comprising a second image sensor and an optical mask coupled to the second image sensor,
      wherein the optical mask comprises opaque regions and open regions, the opaque regions configured to block transmission of light radiation and the open regions configured to transmit light radiation,
      wherein the second image sensor is configured to detect light radiation in the visible near-infrared light spectrum;

wherein the lensless camera is configured to capture images in the first direction, and
wherein the lensed camera and the lensless camera are configured to simultaneously capture multiple time-correlated images of the object in space; and
a processor configured to receive the multiple time-correlated images from the lensed camera and the lensless camera and computationally derive an albedo of the object in space based on the multiple time-correlated images from the lensed camera and the lensless camera.

2. The space-based imaging system of claim 1, wherein the first image sensor and the second image sensor are each configured to detect light radiation with a wavelength between 0.4 µm and 1.2 µm.

3. The space-based imaging system of claim 1, further comprising:
a computer storage device coupled to the processor;
an electromagnetic power filter configured to be coupled to a power supply; and
a power converter coupled to the electromagnetic power filter, the computer storage device, the processor, the lensed camera, and the lensless camera.

4. The space-based imaging system of claim 1, wherein the lensed camera and the lensless camera are configured to face the object in space continuously while the multiple time-correlated images are captured.

5. The space-based imaging system of claim 1, wherein the computationally derived albedo contributes to radiative forcing estimations that study top-of-atmosphere and surface changes, including land use, snow decline, desertification, or deforestation, that affect aggregate climate sensitivity and Earth's energy balance which are indicators of climate change.

6. The space-based imaging system of claim 1, wherein the processor is remotely located and communicatively coupled to the space-based imaging system.

7. A method of imaging an albedo of an object in space, the method comprising:
arranging an imaging system in a spacecraft with a first orientation facing the object,
wherein the imaging system comprises a lensless imager configured with the first orientation to capture images of the object,
wherein the lensless imager includes an image sensor and an optical mask positioned between the image sensor and the object; and
wherein the imaging system is orbiting around the object;
maintaining the imaging system in the first orientation during a first imaging data capture session;
capturing a first set of images at a uniform predetermined interval with the imaging system during the first imaging data capture session of a predetermined duration; and
computationally deriving the albedo of the object based on image data stored in the first set of images and reference image data stored in reference images of the object that were captured using a lensed imaging system positioned in the first orientation in the spacecraft or a different spacecraft,
wherein the image data stored in the first set of images is time-correlated to the reference image data stored in the reference images.

8. The method of claim 7,
capturing a second set of images using a lensed imager at an identical time and predetermined interval as the first set of images; and
time-correlating the first set of images captured with the lensless imager with the second set of images.

9. The method of claim 7, further comprising
maintaining the imaging system with the first orientation facing the object during a second imaging data capture session; and
capturing images at the uniform predetermined interval with the imaging system during the second imaging data capture session for the predetermined duration.

10. The method of claim 9, further comprising
maintaining the imaging system with the first orientation facing the object during a third imaging data capture session; and
capturing images at the uniform predetermined interval with the imaging system during the third imaging data capture session for the predetermined duration.

11. The method of claim 7, wherein
the uniform predetermined interval is proportional to the duration of an orbit around the object.

12. The method of claim 11, wherein the uniform predetermined interval is of a length to allow for the capture of overlapping images, further comprising:
generating a seamless composite image of the object.

13. The method of claim 12, wherein
the uniform predetermined interval is between 1 second and 100 seconds.

14. An imaging system housed in a spacecraft, the imaging system comprising:
a lensed imager comprising a first image sensor and an optical lens, wherein the lensed imager is positioned in a first orientation,
a lensless imager comprising a second image sensor and an optical mask positioned between the second image sensor and an object in space,
wherein the lensless imager is positioned in the first orientation;
wherein the lensed imager and the lensless imager are configured to simultaneously capture a time-correlated image of an identical location on the object, and
wherein the lensed imager and lensless imager orbit the object; and
a processor coupled to the lensed imager and the lensless imager,
wherein the processor is configured to process image data from multiple time-correlated images from the lensed imager and the lensless imager to computationally derive an albedo of the object.

15. The imaging system of claim 14, wherein the lensed imager and the lensless imager are configured to capture an albedo of an object in space by capturing multiple time-correlated images with the lensed imager and the lensless imager as the imaging system orbits the object.

16. The imaging system of claim 15, wherein the lensed imager and the lensless imager are configured to face the object continuously while multiple time-correlated images are captured.

17. The imaging system of claim 14, further comprising:
an electromagnetic power filter configured to be coupled to a power supply; and
a power converter coupled to the electromagnetic power filter, a computer storage device, the processor, the lensed imager, and the lensless imager.

18. The imaging system of claim 14, further comprising:
a data interconnect board coupled to the processor, the lensed imager, and the lensless imager.

19. The imaging system of claim 14, further comprising:
a networking unit coupled to the processor and configured to transmit the multiple time-correlated images to a remote system.

20. The imaging system of claim 14, wherein the lensed imager and the lensless imager are configured to capture light with a wavelength between 0.4 µm and 1.2 µm.

* * * * *